UNITED STATES PATENT OFFICE.

MELVIN C. DEAN, OF NILES, OHIO.

WELDING AND TEMPERING COMPOUND.

SPECIFICATION forming part of Letters Patent No. 659,055, dated October 2, 1900.

Application filed April 20, 1900. Serial No. 13,564. (No specimens.)

*To all whom it may concern:*

Be it known that I, MELVIN C. DEAN, of Niles, in the county of Trumbull and State of Ohio, have invented certain new and useful Improvements in Welding and Tempering Compounds; and I do hereby declare the following to be a full, clear, and exact description of the invention, such as will enable others skilled in the art to which it appertains to make and use the same.

This invention has reference to a compound for welding and tempering iron and steel.

The object of the invention is to provide a simple and inexpensive compound the proper use and application of which will expedite and facilitate all tempering and welding operations and will enable burnt steel to be utilized for manufacturing purposes and iron to be welded without being affected by the sulfur in coal or coke, whereby an even smooth weld will be obtained. The compound will improve the quality of all or nearly all steel on which it is used. It will restore impoverished steel to its former nature.

My compound is composed of pulverized borax, one pound; black oxid of manganese, four ounces, and carbonate of iron, one ounce, all thoroughly mixed together. While, of course, I am not to be restricted to these proportions, yet use and experiments have demonstrated that their observance is important to the accomplishment of successful results.

In welding the welds are first prepared. The compound is then applied to the parts to be welded, after which the second heat is made, and in this heat the compound is absorbed by the steel. For tempering a dark cherry-red heat is first obtained, and then the compound is applied, which penetrates or is absorbed by the steel, which is then forged. I have found that burnt steel may be restored by being thus worked with my compound and, it being then better than even before it was burnt, may be utilized for manufacturing purposes—such, for instance, as machinists' tools. It has also been demonstrated that springs may be welded as readily as ordinary iron, with the result that the welded point is better and stronger than before. Without this compound the springs to be welded must be firmly fastened together. In welding iron the compound acts as a protection against the sulfur in coal or coke and enables me to obtain a perfect weld.

While I am aware that some of the ingredients of my compound have heretofore been used in connection with other mixtures, yet I am not aware of the previous existence of any compound for welding and tempering iron and steel and restoring the useful properties in burnt steel wherein black oxid of manganese is used conjunctively with borax and carbonate of iron in substantially the proportions herein stated. I find that by the use of the black oxid of manganese the other ingredients are caused to at once enter into the iron, while the entire mixture is such that, as hereinbefore stated, the tempering of steel is greatly facilitated, as is also the welding of both steel and iron.

I claim as my invention—

The compound herein described for tempering and welding iron and steel, consisting of pulverized borax, black oxid of manganese and carbonate of iron, as set forth.

In testimony whereof I have signed this specification in the presence of two subscribing witnesses.

MELVIN C. DEAN.

Witnesses:
EDNA H. PEW,
W. H. SMILEY.